March 2, 1965   A. H. RICE ETAL   3,171,802
SEWAGE TREATMENT
Filed Nov. 14, 1962
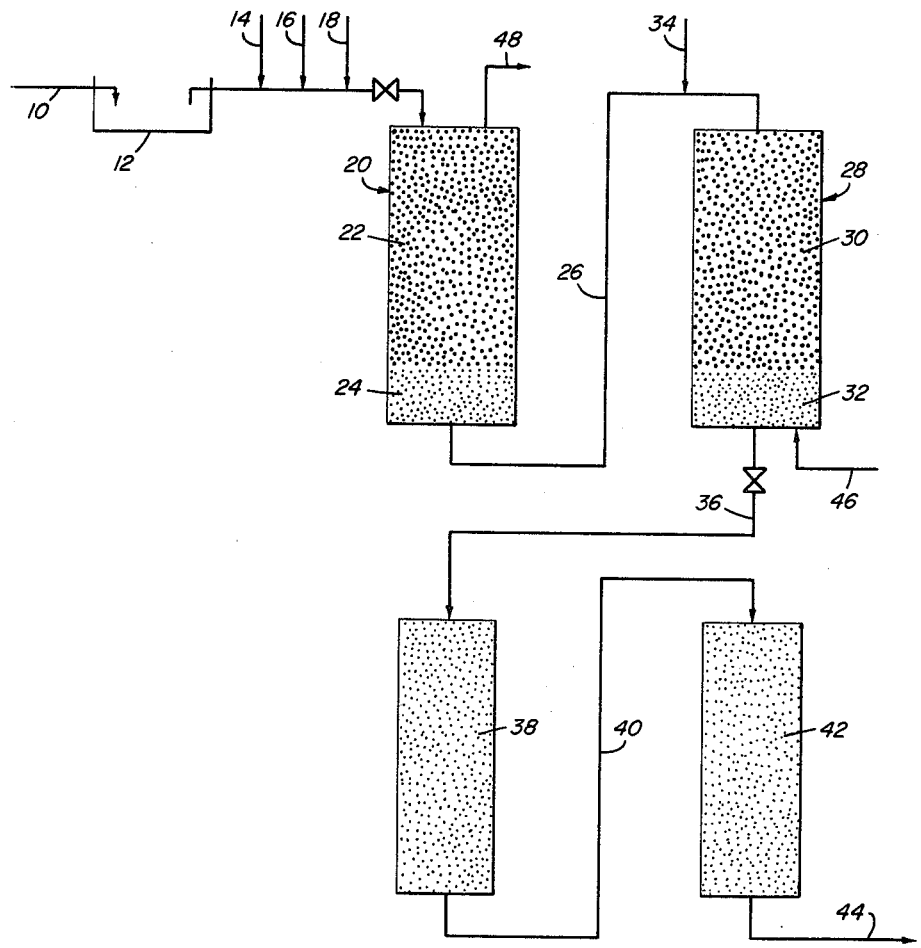
ARCHIE H. RICE
WALTER R. CONLEY
INVENTORS.
BY
BUCKHORN, BLORE, KLARQUIST & SPARKMAN
ATTORNEYS United States Patent Office 3,171,802
Patented Mar. 2, 1965

3,171,802
SEWAGE TREATMENT
Archie H. Rice and Walter R. Conley, Corvallis, Oreg., assignors to General Services Company, a corporation of Oregon
Filed Nov. 14, 1962, Ser. No. 237,555
8 Claims. (Cl. 210—52)

The present invention relates to the treatment of sewage and like wastes and more particularly to the removal of alkyl benzyl sulfonates and other foreign materials difficult to remove in ordinary treatment processes.

Because of their superior detergent qualities, certain alkyl benzyl sulfonate compounds (commonly and hereinafter referred to as ABS) are used extensively in domestic and commercial detergents. These compounds are not subject to removal by flocculation and being resistant to bacterial attack cannot be removed in conventional filtration or digestive type sewage treatment processes. Since the presence of ABS in discharge water is undesirable because of their high-sudsing qualities and indeterminate effect upon the consumptive quality of the water if it must be reused, it is highly desirable that ABS be removed from sewage prior to its discharge into a stream or other receiving body, or its recirculation or other use. It is highly desirable also to remove from sewage and similar wastes those materials which effect the consumption of oxygen from a receiving body of water upon the discharge of the sewage or waste effluent into such body of water. The quantity of such materials is usually measured in terms of their biological oxygen demand or BOD as hereinafter termed.

It is, therefore, an object of the present invention to provide a new and improved process for treating sewage and like wastes that will efficiently remove ABS.

Another object is to provide a process that will remove from sewage a substantial portion of BOD creating materials present therein.

Still another object is to provide an efficient, economical process for treating sewage to remove turbidity therefrom along with phosphate values and color imparting materials.

Still other objects and advantages will become more apparent hereinafter.

In accordance with the present invention a coagulant and a polyelectrolyte or conditioning agent is added to the sewage to be treated, the pH of the sewage adjusted to within predetermined limits and the sewage then passed through a plurality of separation beds each comprising a relatively deep layer of coarse filter media and a shallower layer of fine filter media, the beds being constructed and arranged so that the flow is in the direction from the coarse media to the fine media. Preferably an additional amount of polyelectrolyte is added to the sewage immediately prior to its introduction into each separation bed following the first separation bed to receive the sewage. The effluent from the last filter bed in series is then passed through one or more beds of activated carbon.

The process of the invention will be further described with reference to the accompanying drawing wherein there is shown a schematic flow diagram of the process of the invention and the apparatus utilized in the practice thereof.

For the purpose of this application the terms used herein are defined as follows:

(1) *Coagulant.*—A material capable upon addition to sewage or a like waste of producing a floc.

(2) *Polyelectrolyte or conditioning agent.*—A naturally occurring biocolloid or a synthetic compound containing recurring units of small molecular weight chemically combined to form a molecule of large size. Because these compounds have the characteristics of both polymers and electrolytes, they are called polymeric electrolytes or polyelectrolytes. Based on the electrical charge which they carry, they are classified as anionic, cationic or nonionic.

Referring now to the drawing, indiacted at 10 is the line through which is received the sewage or waste to be treated. This may be raw, previously untreated sewage or waste or may be the effluent from the primary treatment process of a conventional treatment plant. If the sewage or waste has been previously untreated and is carrying large amounts of easily settleable solids, it is preferably passed through a settling basin, indicated at 12, to permit such solids to settle out. The effluent from the basin 12 is then treated with alum and pH control chemicals, indicated at 14, 16, respectively, and finally with polyelectrolyte at 18 *i*mmediately prior to the passage of the sewage into a separation bed 20. The bed 20 is shown as a dual media bed having an upper layer 22 of relatively coarse filter media and a lower layer 24 of a finer filter media. The effluent from the bed 20 is then passed through a line 26 to a second separation bed 28 which also comprises an upper layer 30 of coarse filter media and a lower layer 32 of a finer filter media. Preferably an additional amount of polyelectrolyte 34 is added to the effluent from the bed 20 immediately prior to its introduction to the separation bed 28. In some instances it may be desirable to add other reactants at this point.

From the separation bed 28 the effluent is conducted by a line 36 to a bed 38 of activated carbon and by a line 40 from the latter bed to a second bed 42 of activated carbon. The effluent from the latter bed, substantially free of BOD, ABS and turbidity, may be carried by a line 44 to a discharge point or point of reuse.

Preferably suitable piping, indicated by an entrance line 46 and a discharge line 48, is provided to enable periodic backwashing of the separation beds 20, 28 as they become filled with collected solids.

The coarse media of the filter beds 20, 28 may range from —6 to +20 U.S. sieve mesh size. Preferably the coarse media should range in size from —10 to +20 mesh size as this mesh size appears to require a minimum amount of polyelectrolyte to produce satisfactory results. In any case the layer of coarse media should be of rather uniformly sized material so as to minimize migration of the finer particles to the top of the layer as will occur if the size variation is too great. The coarse layers 22, 30 should have a minimum depth of about eighteen inches and preferably are from about twenty-two to third inches in depth. A preferred material for the coarse layer is crushed anthracite coal, though other materials such as natural graphite may be used. Where the separation beds are dual media type as illustrated it is preferred the material of the coarse layers 22, 30 be less dense than the material of the lower, finer layers.

The media of the lower filter layers 24, 32 preferably is of silica sand or like dense media of between about −30 to +40 mesh size. The layers 24, 32 should have a minimum depth of about six inches and preferably have a depth of between about eight to twelve inches. As indicated above, the layers of coarse and fine material of a separation bed need not be contained within a single unit but may be provided as separate, discrete bodies.

The filters 38, 42 each comprise an activated carbon, such as Pittsburgh Chemical Company type SLG, having a size range of about −8 to +30 mesh. Such filters preferably are between about thirty to forty inches in depth.

While two separation beds are illustrated under conditions of extreme turbidity an additional bed or beds may be desired. Also a single bed of activated carbon may suffice in some instances.

Included among the possible coagulants in the practice of the invention are such salts as aluminum sulphate, copper sulphate, ferric chloride, ferric sulphate and ferrous sulphate. The choice will depend on the characteristics of the sewage being treated. The amount of coagulant utilized will also depend upon the nature of the turbidity imparting materials and the amount thereof in the sewage being treated. The amount of coagulant required will ordinarily increase as the turbidity increases. In general the amount of coagulant required will be from 5 to 300 p.p.m.

As mentioned previously, suitable polyelectrolytes or coagulant aids are found in naturally occurring biocolloids. Among these are seaweed derivatives, guar gum and ammonium lignosulfonates derived from wood. The synthetic coagulant aids include polysaccharides, polyacrylamides, acrylamide polymer hydrolytes, and polyacrylamides having carboxylic groups substituted for some of the amide groups. Suitable synthetic polyelectrolytes presently commercially available include Nalco 110, manufactured by the Nalco Company and Separan AP 30 and Separan NP 10, products of Dow Chemical Company. The latter product is reported to have a molecular weight of approximately one million and is represented by the formula:

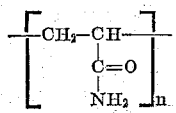

Separan NP 10 is formed by the polymerization of acrylamide. Because of the preponderance of amide groups, the polyacrylamide is essentially nonionic in solution although a small amount of the amide groups are usually hydrolized to anionic carboxyl groupings. It is a white, free flowing, amorphous solid with a bulk density of 0.55 gram per cubic centimeter. It softens at 220–230° C. and decomposition is evident at 270° C. It is rapidly wetted by water and is soluble in water in all proportions.

The amount of polyelectrolyte to be added may be varied over a considerable range. Generally larger amounts of turbidity producing solids in the water will require larger amounts of polyelectrolyte. Amounts from about 0.5 part per million to over 24.0 parts per million have proven effective. The dosage of the polyelectrolyte is preferably divided so that a portion is added to the sewage being treated within a few minutes prior to its entry into each separation bed. If added too long a time prior to entry of the sewage into the separation bed, the effectiveness of the polyelectrolyte is appreciably diminished. Preferably the polyelectrolyte is added as a dilute aqueous solution having a concentration of about 0.1 percent.

Control of pH is quite important. The pH may range between about 4.0 to 6.5, but best results have been obtained when the pH is maintained between about 4.5 to 5.0. The usual chemicals such as sulphuric acid, caustic soda and lime may be used to adjust the pH.

The filtering rate may vary between about two to ten gallons per minute per square foot of filter area but preferably is maintained at about five gallons per minute which appears to be about the optimum rate economically. At higher rates the head loss on the separation beds increases too rapidly and at lower rates excessive amounts of filter area are required to provide capacity.

When excessive head loss occurs in the separation beds 20, 28 by accumulation of floc and solids removed from the sewage, they may be backwashed by introducing a wash water into the same through the line 46 and discharging it through a line 48. Other suitable arrangements for backwashing the beds will be apparent. The difference in density of the media layers is desired of course so as to maintain separation thereof during backwashing.

When the efficiency of the carbon filters 38, 42 drops off they are simply recharged with fresh activated carbon.

EXAMPLE

A number of tests were carried out on the effluent from the primary treatment plant of the city of Corvallis, Oregon. The effluent was passed through a system such as shown in the accompanying drawing except that no settling basin was utilized and in some instances one filter of activated carbon was utilized and in other instances two filters. The turbidity of the effluent water being treated ranged from about 50 to 150 p.p.m. The waste treated at the plant included domestic sewage and cannery wastes including those resulting from canning of corn, cherries, beans, and beets, the latter imparting a high degree of color to the waste that was not removed to any degree by the primary treatment.

The effluent from the plant was passed through two separation beds each composed of an upper layer of about twenty-two inches of −10 to +20 anthracite and a lower layer of eight inches of −30 to +40 sand. Prior to the introduction to the first bed aluminum sulfate was added in the amounts indicated in Table I below and the pH thereafter adjusted with sulphuric acid to the indicated levels. Polyelectrolyte in the form of a 0.01% aqueous solution of Separan NP 10 was then added and the effluent immediately passed to the first separation bed. The effluent from the first separation bed was then treated with an additional amount of Separan NP10 and passed to the second separation bed, the amount of Separan NP 10 added for the various runs being indicated in Table I. In the first five runs shown in Table I the effluent from the second separation bed was passed through a single activated carbon filter having a depth of about thirty-two inches. In the other runs a second bed of activated carbon of about forty inches was added in series to the first.

In the first column of Table I is shown the amount of ABS in the raw effluent being treated. The second column indicates the amount of ABS remaining after passage through the separation beds. It will be observed that a significant amount is removed in such beds.

The columns labeled #1 carbon and #2 carbon show the amount of ABS remaining in the effluent discharging from the respective filter.

The next columns indicate the amounts of alum and Separan added, and in the last column is shown the turbidity of the water discharging from the second separation bed.

All filter runs were made at a flow rate of five gallons per square foot per minute.

Table 1

| Run No. | ABS, p.p.m. | | | | Alum, p.p.m. | Separan, p.p.m. | | pH | Filter Turb., p.p.m. |
| --- | --- | --- | --- | --- | --- | --- | --- | --- | --- |
| | Raw | Filter | #1 Carbon | #2 Carbon | | Bed #1 | Bed #2 | | |
| 1 | 1.6 | 0.4 | 0.00 | | 187 | 0.75 | 0.75 | 5.2 | 0.30 |
| 2 | 4.4 | 1.0 | 0.05 | | 187 | 0.75 | 0.75 | 6.5 | 0.27 |
| 3 | 1.6 | 0.4 | 0.10 | | 250 | 0.75 | 0.75 | 4.4 | 0.35 |
| 4 | 2.4 | 0.4 | 0.05 | | 150 | 0.75 | 0.75 | 4.3 | 0.45 |
| 5 | 3.6 | 1.6 | 0.5 | | 179 | 0.75 | 0.75 | 4.6 | 0.3 |
| 6 | 4.0 | 2.0 | 0.7 | 0.2 | 136 | 0.94 | 0.94 | 4.7 | 2.7 |
| 7 | 5.0 | 0.75 | 0.2 | 0.05 | 148 | 1.1 | 1.1 | 4.5 | 0.6 |
| 8 | 5.0 | 1.2 | 0.1 | 0.05 | 159 | 1.1 | 1.1 | 4.6 | 0.4 |
| 9 | 2.8 | 0.6 | 0.05 | 0.02 | 255 | 0.6 | 0.6 | 4.0 | 0.4 |
| 10 | 2.0 | 1.1 | 0.55 | 0.02 | 210 | 2.0 | 2.0 | 4.9 | 0.7 |
| 11 | 4.0 | 0.7 | 0.05 | 0.00 | 278 | 12.0 | 12.0 | 4.5 | 0.2 |

In addition to removing substantially all of the ABS, between about 70 to 90 percent of the BOD in the primary plant effluent was removed along with about 90 to 95 percent of the phosphates. Furthermore, substantially all of the color was removed so that the water discharging from the carbon filters was substantially clear.

The separation beds in these series of tests could be operated between about six to twelve hours before backwashing was required.

Having illustrated and described a preferred embodiment of the invention it should be apparent the invention permits of modification in arrangement and detail. We claim all such modifications as come within the scope of the appended claims.

We claim:
1. A process for treating sewage which comprises
adding a coagulant to such sewage,
adding a filter conditioner to said sewage,
passing said sewage through a first separation bed comprising a layer of relatively large particles and a discrete layer of smaller particles with said sewage passing in the direction from said large to said small particles, said large particles being less than size 6 U.S. mesh,
adding additional filter conditioner to said sewage emerging from said first separation bed,
passing said sewage through a second separation bed having a layer of large particles and a discrete layer of smaller particles with the sewage again flowing in the direction of the larger particles to the smaller particles, said large particles being less than size 6 U.S. mesh,
and thereafter passing said sewage through a bed of activated carbon.

2. A process for treating sewage which comprises
adding a coagulant to such sewage,
adjusting the pH to obtain optimum coagulation of said coagulant,
adding a filter conditioner to said sewage,
passing said sewage through a first separation bed comprising a layer of relatively large particles and a discrete layer of smaller particles with said sewage passing in the direction from said large to said small particles, said large particles being less than size 6 U.S. mesh,
adding additional filter conditioner to said sewage emerging from said first separation bed,
passing said sewage through a second separation bed having a layer of large particles and a discrete layer of smaller particles with the sewage again flowing in the direction of the larger particles to the smaller particles, said large particles being less than size 6 U.S. mesh,
and thereafter passing said sewage through a bed of activated carbon.

3. A process for treating sewage which comprises
adding a coagulant to such sewage,
adjusting the pH to between about 4 to 5,
adding a filter conditioner to said sewage,
passing said sewage through a first separation bed comprising a layer of relatively large particles and a discrete layer of smaller particles with said sewage passing in the direction from said large to said small particles, said large particles being less than size 6 U.S. mesh,
adding additional filter conditioner to said sewage emerging from said first separation bed,
passing said sewage through a second separation bed having a layer of large particles and a discrete layer of smaller particles with the sewage again flowing in the direction of the larger particles to the smaller particles, said large particles being less than size 6 U.S. mesh,
and thereafter passing said sewage through a bed of activated carbon.

4. A process for treating sewage which comprises
adding a coagulant to such sewage,
adjusting the pH to between about 4 to 5,
adding a filter conditioner to said sewage,
passing said sewage through a series of separation beds each comprising a layer of crushed anthracite coal having a particle size of between about −6 to +20 mesh size, and a discrete layer of sand of from −30 to +40 mesh size with said sewage passing in the direction from said coal to said sand in each bed,
adding additional filter conditioner to said sewage prior to its introduction into each separation bed subsequent to the first of said separation beds,
and thereafter passing said sewage through a bed of −8 to +30 mesh size activated carbon.

5. A process for treating sewage which comprises,
adding between about 5 to 300 p.p.m. alum to such sewage,
adjusting the pH of such sewage to between about 4.0 to 5.5,
adding between about 0.5 to 24.0 p.p.m. polyelectrolyte,
passing said sewage through a series of separation beds each comprising a layer of crushed anthracite coal having a particle size of between about −6 to +20 mesh size and a layer of sand of from −30 to +40 mesh size with said sewage passing in the direction from said coal to said sand in each bed,
and thereafter passing said sewage through activated carbon.

6. A process as set forth in claim 5 wherein the dosage of said polyelectrolyte is divided and a portion is added to the sewage immediately prior to the introduction of the sewage into each of said separation beds.

7. A process for treating sewage which comprises,
adding between about 150 to 250 p.p.m. alum,
adjusting the pH to between about 4.0 to 6.5,
adding between about 0.6 to 12.0 p.p.m. polyelectrolyte,
passing said sewage through a first separation bed comprising a layer of crushed anthracite coal of between about −10 to +20 mesh size and a layer of sand of between about −30 to +40 mesh size with said sewage passing from said coal to said sand, adding between about 0.6 to 12.0 p.p.m. polyelectrolyte to the effluent from said first separation bed, passing said effluent through a second separation bed comprising a layer of crushed anthracite coal of between about −10 to +20 mesh size and a layer of sand of between about −30 to +40 mesh size with said sewage passing from said coal to said sand, and thereafter passing said sewage through a bed of activated carbon.

8. A process for treating sewage as set forth in claim 7 wherein, each of said layers of coal was about twenty-two inches in depth, each of said layers of sand was about eight inches in depth, and said bed of activated carbon is at least about thirty-two inches in depth.

References Cited in the file of this patent

UNITED STATES PATENTS 212,023   Maeurer _____ Feb. 4, 1879

OTHER REFERENCES

"The Purification of Sewage and Water," Dibdin, third edition, 1903, D. Van Nostrand Co., New York, pp. 149–190.

"Syndet Removal From Drinking Water Using Activated Carbon," Lieber, Water and Sewage Works, Reference Number, 1961, vol. 108, pages R–123, R–124 and R–126.

"Experience With Anthracite-Sand Filters," Conley, Jour. AWWA, December 1961, vol. 53, pp. 1473–1483.

"Emergency Use of Reclaimed Water for Potable Supply at Chanute, Kans.," Metzler et al., Jour. AWWA, August 1958, vol. 50, pp. 1021–1060.

UNITED STATES PATENT OFFICE
CERTIFICATE OF CORRECTION

Patent No. 3,171,802    March 2, 1965

Archie H. Rice et al.

It is hereby certified that error appears in the above numbered patent requiring correction and that the said Letters Patent should read as corrected below.

Column 2, line 14, for "indiacted" read -- indicated --; line 59, for "third" read -- thirty --.

Signed and sealed this 3rd day of August 1965.

(SEAL)
Attest:

ERNEST W. SWIDER
Attesting Officer

EDWARD J. BRENNER
Commissioner of Patents